Jan. 20, 1970     R. C. THOMASSIN     3,490,165
LURE FOR FISHING
Filed Oct. 24, 1966     2 Sheets-Sheet 1
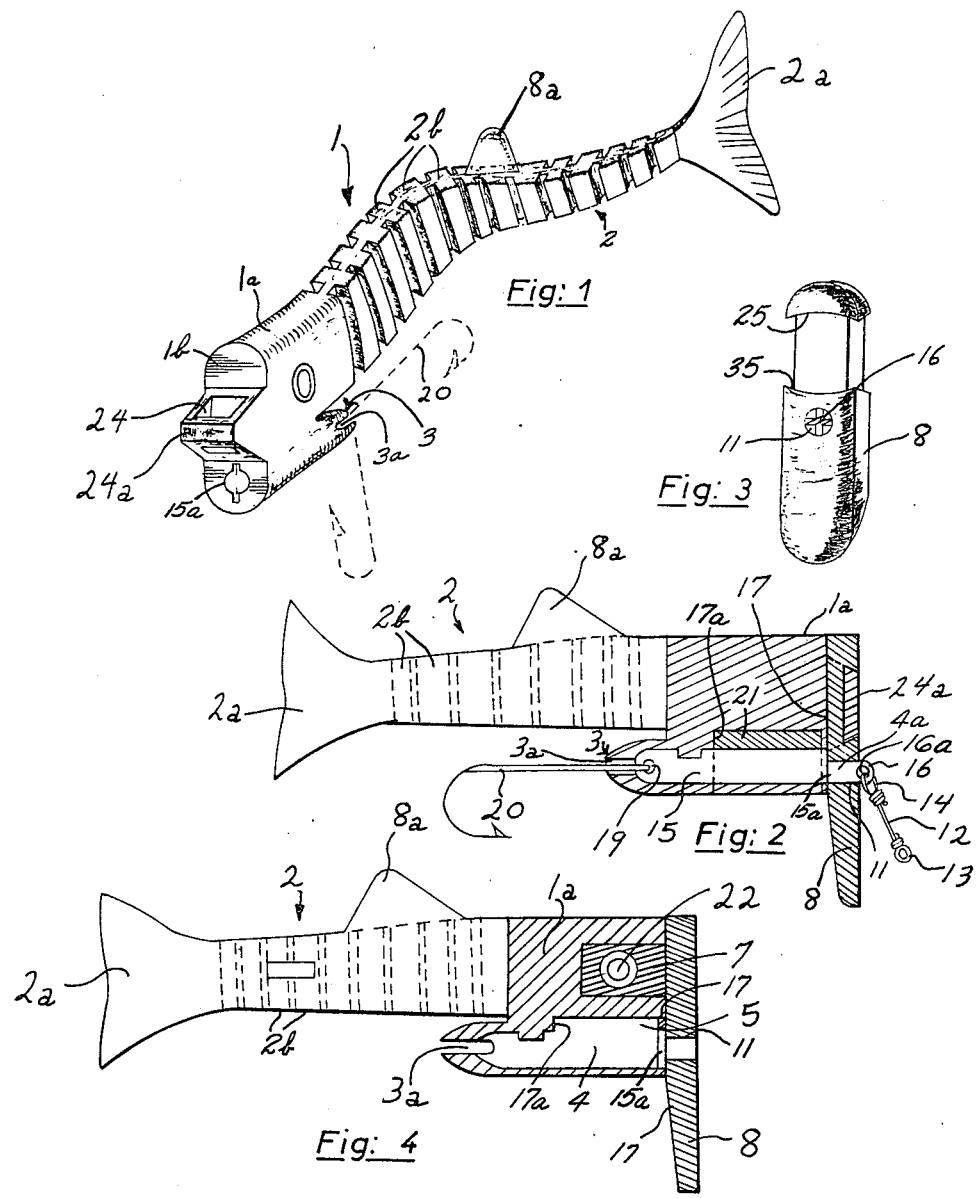
ROBERT C. THOMASSIN
INVENTOR Jan. 20, 1970 R. C. THOMASSIN 3,490,165
LURE FOR FISHING
Filed Oct. 24, 1966 2 Sheets-Sheet 2
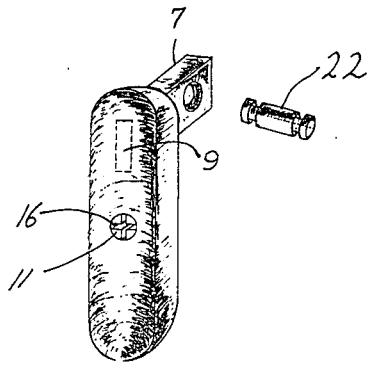
Fig: 5
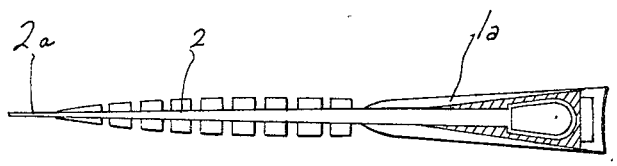
Fig: 6
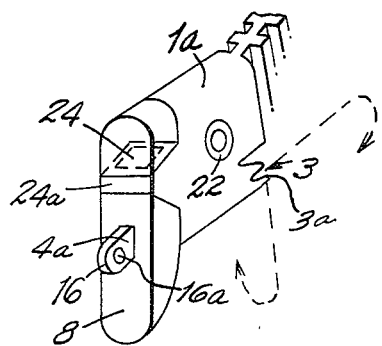
Fig. 7
ROBERT C. THOMASSIN
INVENTOR

United States Patent Office 3,490,165
Patented Jan. 20, 1970

3,490,165
LURE FOR FISHING
Robert Charles Thomassin, 22 Rue de Vitry, Montreuil-sous-Bois, Seine-Saint-Denis, France
Filed Oct. 24, 1966, Ser. No. 589,024
Int. Cl. A01k 91/00
U.S. Cl. 43—42.09                                    4 Claims

ABSTRACT OF THE DISCLOSURE

An artificial fish lure comprising a body fabricated from a flexible material including a head, a ribbed diaphragm and a tail, the ribbed diaphragm being integral with the head and the tail and decreasing in its thickness toward the tail. Weight means are located in the head below the center of the head and an elongated blade means is secured to the front surface of the head in a location perpendicular to the horizontal plane passing through the center of the body of the lure.

---

An object of the invention is to provide a lure for fishing and more particularly a lure for moving in the water faithfully reproducing the natural swimming action of a fish.

Another object of the invention is to produce a lure simulating a swimming fish which is adaptable for fishing with both horizontal or vertical leads.

Another object of the invention is to produce a fish lure wherein the swimming speed can be modified to adapt to the speed of the current, the depth of the lure, and the speed at which the lure is being moved.

Other objects and advantages will be revealed by the following description, claims and attached drawings, in which:

FIGURE 1 is a perspective view of the lure showing in particular the constitution of the front face of the lure;

FIGURE 2 is a sectional view of the lure showing the insertion of the shaft and the weight;

FIGURE 3 is a perspective view of the front blade of the lure showing the notches;

FIGURE 4 is a sectional view of the lure showing another method of removably securing the blade to the front face of the lure;

FIGURE 5 is a perspective view of an alternative embodiment of the blade as shown in FIGURE 4;

FIGURE 6 is a top view of the lure, partially in section, showing the manner of assembly of the lure of this invention; and, FIGURE 7 is a perspective view of the front of the lure showing the blade in position.

In accordance with the drawings, the lure, made of flexible material, rubber or synthetic rubber for example, is formed with a head 1a and a jointed body portion 2 extending rearwardly from the head as a flexible diaphragm decreasing in thickness from the head 1a to the tail 2a.

A removable blade of plastic material 8, which is generally rectangular in shape and flat or slightly concave at its front surface, is affixed to the front face 1b of the lure.

The shape, dimension and weight of the removable blade may be varied to adapt to the speed of the lure, the speed of the current, or the depth desired for the lure.

A removable weight 21 is situated in the head portion 1a of the lure which ensures vertical balance and controls oscillations of the lure. Likewise, the blade 8 and the weight 21 are used to control the depth at which the lure operates.

The head 1a is provided with a longitudinal passage 4 extending from a front opening 15a to a rear opening 3a. Immediately above the passage 4 and communicating therewith is a housing 5 to receive the weight 21.

A removable shaft 15 is provided at one end with an aperture 19 for receiving fishhook 20. The shaft 15 when inserted through aperture 11 and opening 15a into passage 4 retains the weight within the passage 1a to ensure the longitudinal stability of the lure.

The position and shape of the blade 8, the dimension and position of the weight together with the ribbed flexible diaphragm 2 and the mobility of the fishhook 20 combine to ensure the swimming-like oscillation of the lure under the pulling effect of the fishing line which is connected to the forward part 16 of the shaft 15 through aperture 16a. The flexible undulatory movements of the diaphragm forming the body 2 thus impart natural wagging motion to the tail of the lure.

The blade 8, as shown in FIGURES 2, 3 and 7, is secured to the head 1a in the elastic flexible fixture 24 provided in the material forming the lure. The blade 8 is provided with notches 25 and 35 which fit into the channel formed by the fixture 24 and the front 1b of the head 1a. The weight 21 is inserted into the head 1a above the shaft 15 and is secured by the shaft 15 in the housing 5, between the shoulders 17, 17a. The shaft 15 has a projecting part 4a at the extreme front edge thereof which projects through the passage 11 provided in the blade 8.

A small leader clip 12 is connected to the projecting part 16 through aperture 16a by ring 14 with the ring 13 being intended to be affixed to the fishing line.

A fishhook 20, open, single or double, is swingably mounted horizontally or vertically in the opening 19 of the shaft 15, this opening being situated in coincidence with the rear opening 3a of the fishhook exit 3 at the rearwardmost portion of the head 1a.

The diaphragm or body 2 is provided with a dorsal fin 8a and caudal fin 2a which prolongs and forms the rear body of the lure in the shape of a fish.

The head 1a of the lure is of generally round or oval cross section. The channel of the blade 8 is characterized by arrangements in the molding of the front face of the blade so as to conform to the head of the lure. A vertical passage 24 is formed in relation to the horizontal front face of the lure through which the blade 8 is inserted by elastic distortion of the walls of the passage as seen in FIG. 7.

The blade 8 is provided with notches 25 and 35 on its front face, which notches are placed horizontally in relation to the vertical plane of the blade 8. The notches 25 and 35 are preferably of dovetail shape and are adapted to seat the male part 24a of the flexible fixture therein, thereby locking the blade 8 in its position at the forward end of the lure.

An alternative embodiment is shown in FIGURE 4 wherein the head is formed with a plug 7 affixed to the rear of the blade 8, the plug 7 being retained in the head 1a by a removable locking pin 22, the ends of which are flush with the lateral sides of the head 1a of the lure 1 simulating the fish's eyes.

The head 1a also has below the center of gravity of the lure 1, a chamber 5 for the weight 21, which chamber has a forward edge 17 and a rear edge 17a. A passage 4 is provided in the flexible material forming the head 1a for receiving the shaft 15. The forward end 16 of the shaft 15 protrudes through the aperture 11 in the blade 8.

In both embodiments the body of the lure is formed having a flexible diaphragm 2 made by molding the entire body and head 1a in one piece all made of flexible material such as rubber, synethetic rubber, etc.

The head 1a in both embodiments has a concave or flat front face, and decreases in width from the front face toward the said diaphragm 2 resulting in the general contour of a fish body.

The diaphragm 2 comprises vertical ribs 2b over its whole length and by its function a vertebral column 2, flexible like that of a real fish, is presented. The diaphragm 2 starts from the head 1a and is also longitudinally centered on the lure. The thickness of the diaphragm 2 decreases towards the tail 2a, ribs 2b being provided on each face of the diaphragm 2 to compensate and coordinate flexibility and rigidity.

As shown in FIG. 6, the diaphragm 2 is integral with the head 1a made of plastic or rubber.

The blade 8 serves to cause undulating flexible motion in irregular, unequal and jerky motion, resembling that of an injured fish.

The rear opening 19 of the shaft 15 is intended to receive the coupling of a fishhook 20, coupled to the shaft 15, the barbs of the fishhook being preferably directed downwards. The fishhook 20 is free to move in any direction, and is intended when not under stress to remain in the fishhook exit 3a which can be deformed under stress due to the resilient nature of the lure.

What is claimed is:

1. An artificial fish lure comprising a body of a flexible material and including a head, a ribbed diaphragm and a tail, said ribbed diaphragm being integral with said head and said tail and decreasing in its thickness toward said tail, weight means horizontally disposed in said head below the center of said head, said head having a removably separate elongated blade means, and elongated flat shaft means removably secured to said elongated blade means and disposed perpendicular to a horizontal plane passing through the center of said body, said weight means held in position by said shaft means positioned therebelow, said shaft means extending through said elongated blade means.

2. An artificial fish lure according to claim 1, wherein said elongated blade means has vertically spaced notches narrower in cross-section than the cross-section of its extremities at a location between its extremities, and said head includes a stretchable projection on said front surface defining a distensible channel therein, said channel having a cross-sectional area substantially equal to the narrow cross-section of said blade means, whereby said blade means is frictionally engaged in said distensible channel, said blade means being lockingly engaged by said projection within said notches.

3. An artificial fish lure according to claim 1, wherein said elongated blade means includes a projection extending from its rear surface, said head including a recess in its front surface of substantially the same shape as the projection on said blade means, said projection on said blade means being disposed in the recess in said head, and pin means passing through said head and said projection for preventing disengagement of said projection from said recess.

4. An artificial fish lure according to claim 1, wherein said blade is provided with an opening, one end of said shaft extending through said blade opening and having means for receiving a leader attachment thereupon, the opposite end of said shaft extending below said ribbed diaphragm and having hook receiving means thereupon.

References Cited

UNITED STATES PATENTS

| | | | |
|---|---|---|---|
| 1,477,864 | 12/1923 | Bolton | 43—42.09 |
| 2,254,949 | 9/1941 | Messacar | 43—42.09 X |
| 2,750,701 | 6/1956 | Beames | 43—42.09 |
| 2,971,285 | 2/1961 | Murawski | 43—35 |
| 1,553,933 | 9/1925 | Dills | 43—42.47 X |
| 1,833,522 | 11/1931 | Goble | 43—42.47 X |
| 2,274,596 | 2/1942 | Fink | 43—42.22 |
| 2,808,677 | 10/1957 | Dusablon et al. | 43—42.22 |

SAMUEL KOREN, Primary Examiner

DANIEL J. LEACH, Assistant Examiner

U.S. Cl. X.R.

43—42.22, 42.24, 42.34, 42.39, 42.47